United States Patent
Jeong et al.

(10) Patent No.: US 8,059,091 B2
(45) Date of Patent: Nov. 15, 2011

(54) APPARATUS AND METHOD FOR CONSTITUTING CHARACTER USING HEAD MOTION

(75) Inventors: Hyuk Jeong, Daejeon (KR); Jong-Sung Kim, Daejeon (KR); Wookho Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1020 days.

(21) Appl. No.: 11/947,376

(22) Filed: Nov. 29, 2007

(65) Prior Publication Data
US 2008/0136681 A1   Jun. 12, 2008

(30) Foreign Application Priority Data

Dec. 4, 2006 (KR) .................. 10-2006-0121364
Jul. 23, 2007 (KR) .................. 10-2007-0073355

(51) Int. Cl.
*G09G 5/00* (2006.01)
(52) U.S. Cl. ..................... 345/156; 345/157; 341/22
(58) Field of Classification Search .......... 345/156–158; 341/21, 22; 340/4.1–4.4; 704/271
See application file for complete search history.

(56) References Cited

U.S. PATENT DOCUMENTS

| | | | | |
|---|---|---|---|---|
| 4,713,535 A * | 12/1987 | Rhoades | ........................ | 250/221 |
| 5,883,616 A * | 3/1999 | Koizumi et al. | .............. | 345/156 |
| 6,801,188 B2 * | 10/2004 | Longobardi | .................. | 345/156 |
| 7,650,017 B2 * | 1/2010 | Yamada | ........................ | 382/107 |
| 7,776,027 B2 * | 8/2010 | Manna et al. | ................. | 604/540 |
| 2003/0038779 A1* | 2/2003 | Baron et al. | .................. | 345/157 |
| 2005/0231520 A1* | 10/2005 | Forest | ........................... | 345/581 |
| 2007/0164985 A1* | 7/2007 | Jeong et al. | .................... | 345/156 |

FOREIGN PATENT DOCUMENTS

| KR | 1020020092880 A | 12/2002 |
|---|---|---|
| KR | 1020040079150 A | 9/2004 |

\* cited by examiner

*Primary Examiner* — Amare Mengistu
*Assistant Examiner* — Premal Patel (57) ABSTRACT

Provided are an apparatus and method for inputting characters by making head motion. In the method for inputting a character by making head motion, a predetermined numeral group is selected among a plurality of numeral groups by shifting a center-point key set on a keyboard displayed on a screen in a predetermined direction along a sensed head motion. Then, one of numeral keys in the selected numeral group is selected by sensing the head motion, and the selected numeral key is inputted.

17 Claims, 6 Drawing Sheets

| HEAD MOTION | SYMBOL (INSTRUCTION) |
|---|---|
| MOVING HEAD TO LEFT AND RETURNING IT TO CENTER QUICKLY | ← |
| MOVING HEAD TO LEFT AND RETURNING IT TO CENTER SLOWLY | ⇐ |
| MOVING HEAD TO RIGHT AND RETURNING IT TO CENTER QUICKLY | → |
| MOVING HEAD TO RIGHT AND RETURNING IT TO CENTER SLOWLY | ⇒ |
| MOVING HEAD TO DOWN DIRECTION AND RETURNING IT TO CENTER QUICKLY | ↓ |
| MOVING HEAD TO DOWN DIRECTION AND RETURNING IT TO CENTER SLOWLY | ⇓ |
|  | ↓ X2 |

FIG. 6

| 1 | 2 | 3 | 4 | 5 | 6 | 7 | 8 | 9 | * | 0 | # |
|---|---|---|---|---|---|---|---|---|---|---|---|
| K1 | K2 | K3 | K4 | K5 | K6 | K7 | K8 | K9 | K* | K0 | K# |

FIG. 7

| KEY NAME | HEAD MOTION SEQUENCE | KEY NAME | HEAD MOTION SEQUENCE | KEY NAME | HEAD MOTION SEQUENCE | KEY NAME | HEAD MOTION SEQUENCE |
|---|---|---|---|---|---|---|---|
| K1 | ⇐ , ← | K4 | ← , ← | K7 | → , ← | K* | ⇒ , ← |
| K2 | ⇐ | K5 | ← | K8 | → | K0 | ⇒ |
| K3 | ⇐ , → | K6 | ← , → | K9 | → , → | K# | ⇒ , → |

FIG. 8

| 1 EWQ | 2 TFY | 3 OP | 4 ADZ | 5 RGV | 6 ILJ | 7 SCX | 8 HUB | 9 NMK | * | 0 space | # |
|---|---|---|---|---|---|---|---|---|---|---|---|

FIG. 9

| 1 ㄱㅁㅋ | 2 ㅅㅈㅋ | 3 ㅓㅕ | 4 ㄴㄷㄸ | 5 ㅇㅎㅌ | 6 ㅣㅜㅠ | 7 ㄹㅂㅃ | 8 ㅗㅆㅍ | 9 ㅏㅛㅑ | * | 0 ㅡㅈㅉ | # |
|---|---|---|---|---|---|---|---|---|---|---|---|

FIG. 10

| 1 EWQ | 2 TFY | 3 OP |
|---|---|---|
| 4 ADZ | 5 RGV | 6 ILJ |
| 7 SCX | 8 HUB | 9 NMK |
| * | 0 space | # |

FIG. 11

| 1 ㄱ ㅁ ㄲ | 2 ㅅ ㅈ ㅋ | 3 ㅓ ㅕ |
|---|---|---|
| 4 ㄴ ㄷ ㄸ | 5 ㅇ ㅎ ㅌ | 6 ㅣ ㅜ ㅠ |
| 7 ㄹ ㅂ ㅃ | 8 ㅗ ㅆ ㅍ | 9 ㅏ ㅛ ㅑ |
| * | 0 ㅡ ㅊ ㅉ | # |

US 8,059,091 B2

APPARATUS AND METHOD FOR CONSTITUTING CHARACTER USING HEAD MOTION

BACKGROUND OF THE INVENTION

1. Field of the Invention

The present invention relates to an apparatus and method for inputting characters by making head motion, and more particularly, to an apparatus and method for inputting characters by selecting a predetermined numeral group from a keyboard displayed on a screen through making a predetermined pattern of head motion and selecting a character assigned to each number in the selected numeral group through making another head motion.

2. Description of the Related Art

There were many methods introduced for enabling a quadriplegic disabled person to input characters into a terminal such as a computer. For example, the quadriplegic disabled person may use voice recognition to input characters. Also, the quadriplegic disabled person may operate a keyboard by holding a long stick using a mouth or teeth. Furthermore, a quadriplegic disabled person may use a sensor for detecting a biological signal generated by clenching and operate a mouse based on the detected biological signal to select predetermined characters in a keyboard displayed on a screen.

Such conventional character inputting methods have shortcomings. That is, it is difficult to use the voice recognition based character inputting method if a quadriplegic disabled person is incapable of speaking or if a quadriplegic disabled person is in a noisy environment. Using of a long stick makes a quadriplegic disabled person uncomfortable and seriously stresses the muscles of a neck and a jaw if a quadriplegic disabled person holds the long stick using the mouth for long time.

SUMMARY OF THE INVENTION

Accordingly, the present invention is directed to an apparatus and method for inputting characters by making head motion which substantially obviates one or more problems due to limitations and disadvantages of the related art.

It is an object of the present invention to provide an apparatus and method for inputting characters by selecting numbers and characters of a keyboard displayed on a screen by sensing the direction and the speed of head motion made by a quadriplegic disabled person.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for inputting a character by making head motion including the steps of: a) selecting a predetermined numeral group among a plurality of numeral groups by shifting a center-point key set on a keyboard displayed on a screen in a predetermined direction along a sensed head motion; b) selecting one of numeral keys in the selected numeral group by sensing the head motion; and c) inputting the selected numeral key.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
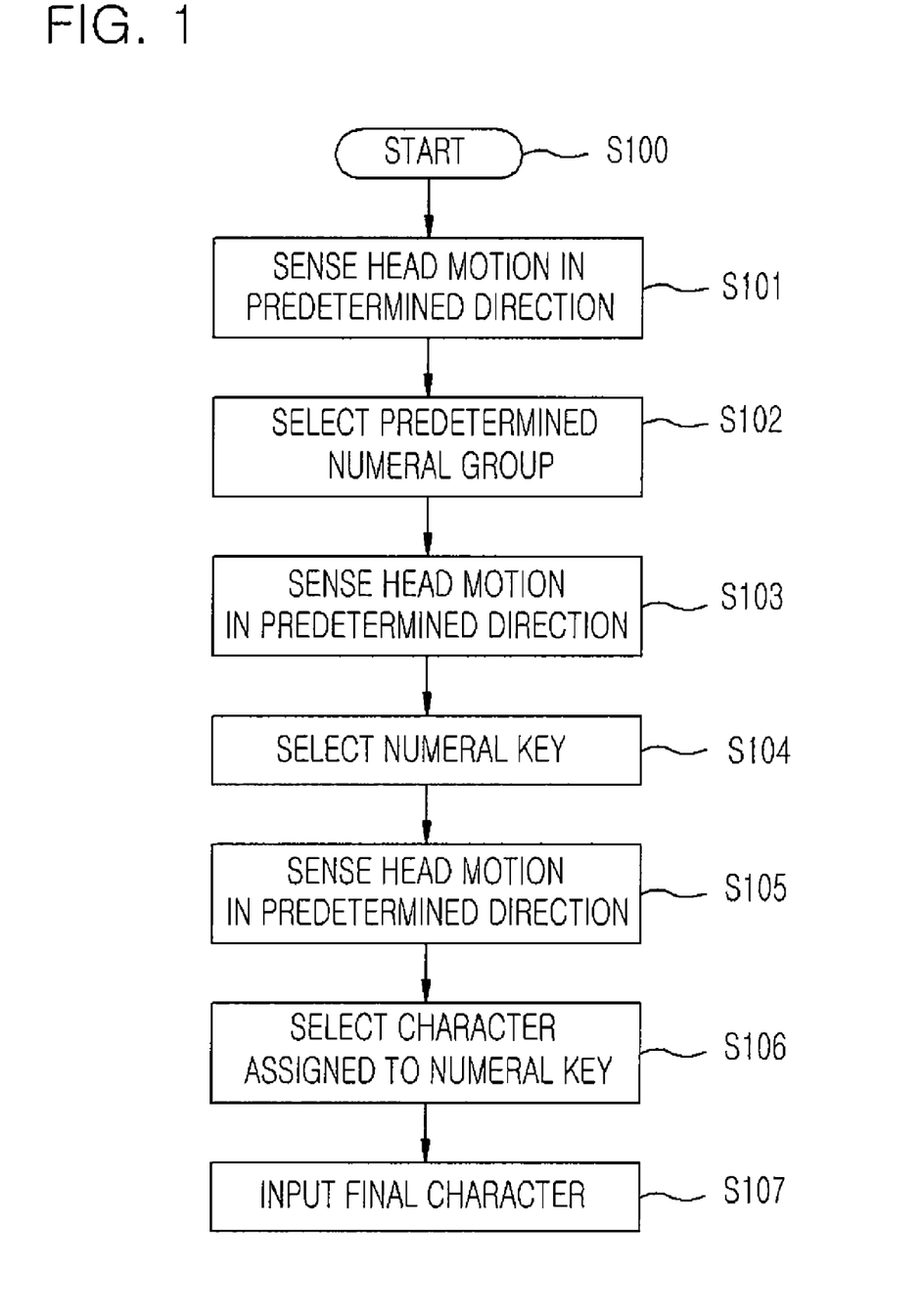
FIG. 1 is a flowchart illustrating a method for selecting and inputting characters by making head motion according to an embodiment of the present invention.

FIG. 1 is a flowchart illustrating a method for selecting and inputting characters by making head motion according to an embodiment of the present invention.

Referring to FIG. 1, when a corresponding program or a corresponding apparatus starts at step S100, a user selects a predetermined numeral group having a target character from a keyboard displayed on a screen at step S102 by making head motions in a predetermined direction at step S101. Then, a user selects a numeral key in the selected numeral group at step S104 by making head motion in a predetermined direction at step S103.

After one numeral key is selected at step S104, a user selects one of three characters assigned to the selected numeral key at step S106 by making head motion in a predetermined direction at step S105. As described above, the corresponding program or the corresponding apparatus returns to the initial state after the selected last character input at step S107.

Figure 2:
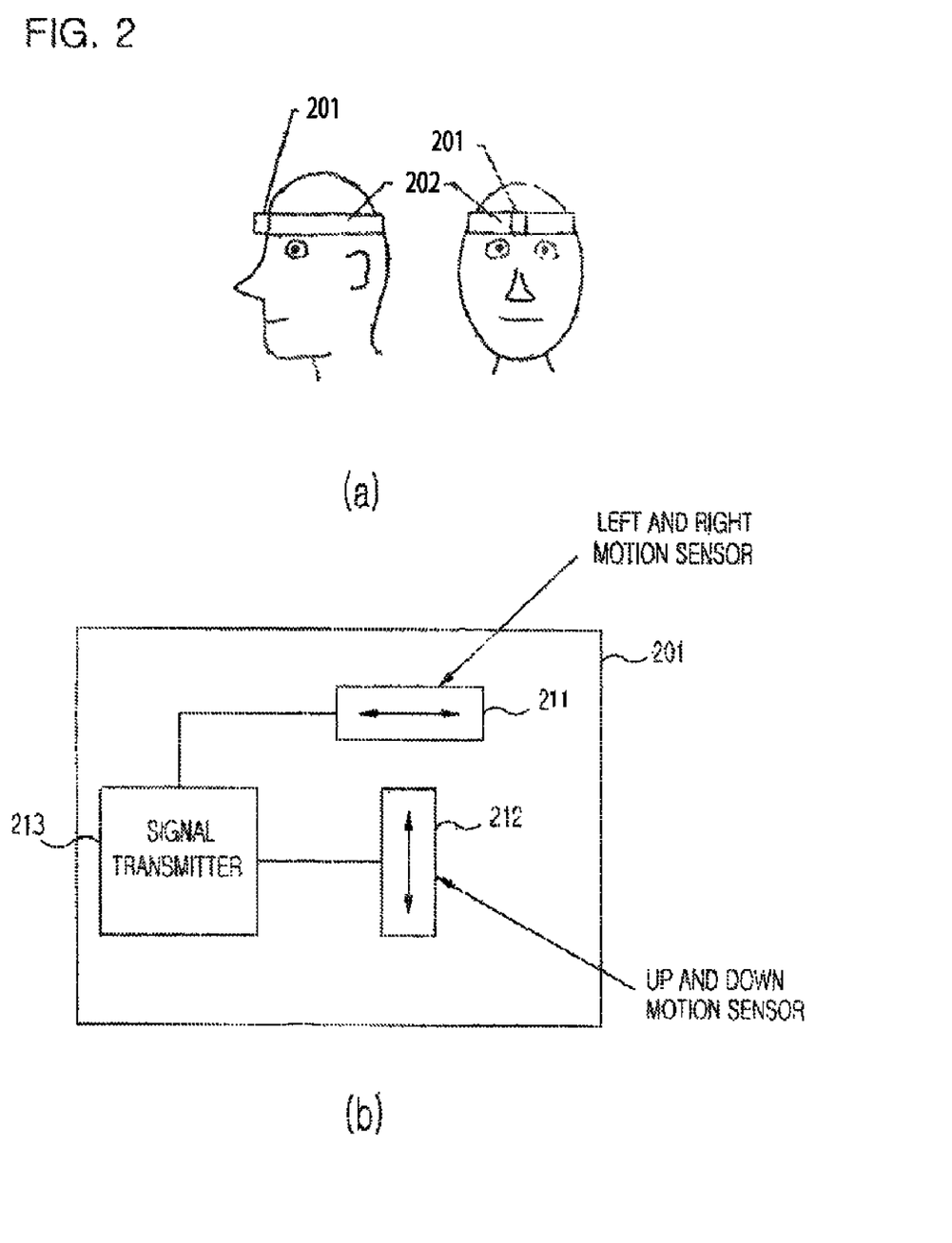
FIG. 2 illustrates a signal detecting device according to an embodiment of the present invention, a diagram a) of FIG. 2 shows a signal detecting device worn by a user's head for sensing head motion, and a diagram b) of FIG. 2 is a block diagram illustrating a two-axial motion sensing module 201 having two one-axial acceleration sensors in the signal detecting device.

FIG. 2 illustrates a signal detecting device according to an embodiment of the present invention, a diagram a) of FIG. 2 shows a signal detecting device worn by a user's head for sensing head motion, and a diagram b) of FIG. 2 is a block diagram illustrating a two-axial motion sensing module 201 having two one-axial acceleration sensors in the signal detecting device.

As shown in the diagram a) of FIG. 2, the signal detecting device is worn on a forehead using a head band. The signal detecting device includes a two-axial motion sensing module 201 for sensing head motion and a headband 202 for attaching the two-axial motion sensing module on the forehead.

As shown in the diagram b) of FIG., the two-axial motion sensing module 201 includes a left and right motion sensor 211, an up and down motion sensor 212, and a signal transmitter 213. An acceleration sensor may be used as the motion sensors 211 and 212.

The acceleration sensor is a sensor that detects one-axial motion. It has been widely used in a mobile phone and various electronic devices. In the present embodiment, at least two one-axial acceleration sensors are disposed in the motion sensing module 201 to detect up and down head motions and left and right head motions.

When the left and right motion sensor 211 and the up and down motion sensor 212 sense the head motion of a user, the signal transmitter 213 transforms the acceleration signal of the sensed head motion to a digital signal and transfers the digital signal to the signal processor 301.

Figure 3:
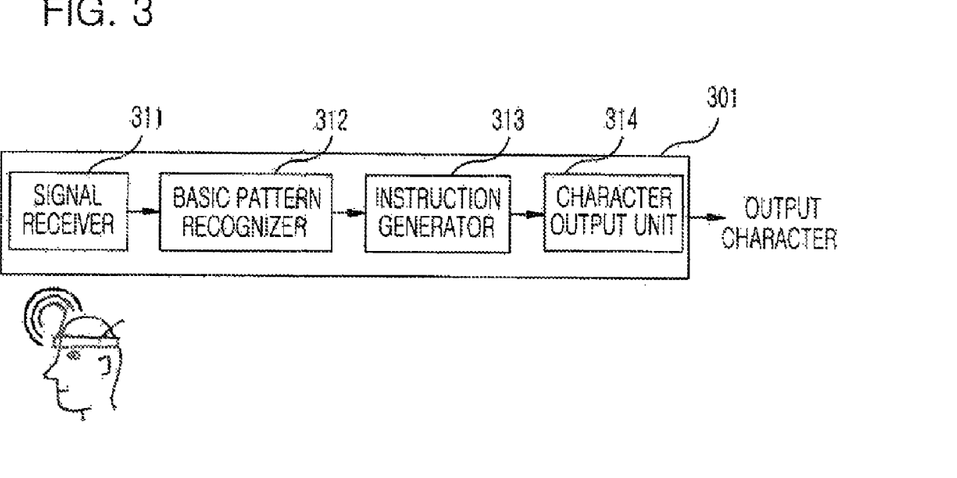
FIG. 3 is a block diagram illustrating a signal processor 301 for outputting characters by receiving a signal generated by making head motion in an up direction, a down direction, a left direction, and a right direction using acceleration sensors 211 and 212 according to an embodiment of the present invention.

FIG. 3 is a block diagram illustrating a signal processor 301 for outputting characters by receiving a signal generated by making head motion in an up direction, a down direction, a left direction, and a right direction using acceleration sensors 211 and 212 according to an embodiment of the present invention. The signal processor 301 includes a signal receiver 311, a basic pattern recognizer 312, an instruction generator 313, and a character output unit 314.

After a user wears the motion sensing module for sensing head motion and turns on the motion sensing module, the motion sensing module detects the head motions, generates the acceleration signal based on the detected head motions, and transmits the acceleration signal to the signal processor 301.

The signal receiver 311 receives the acceleration signal generated according to the head motion that is made in a left and right direction or an up and down direction. The basic pattern recognizer 312 recognizes a pattern of the detected head motions by analyzing the received signal and detects a direction of the detected head motions among an up direction, a down direction, a left direction, and a right direction. Then, an instruction is generated according to predefined pattern rules, a predetermined character is selected and outputted.

Figure 4:
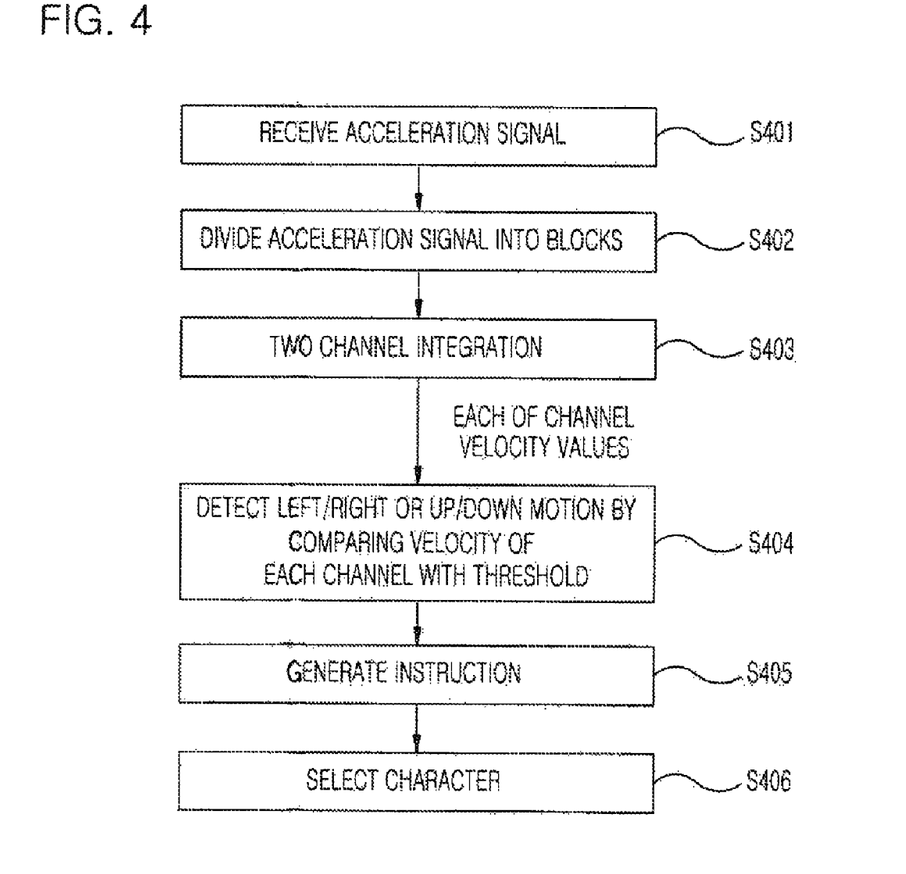
FIG. 4 is a flowchart illustrating a step of receiving an acceleration signal to detect up and down or left and right head motions and generating a character creating instruction based on the received acceleration signal according to an embodiment of the present invention.

FIG. 4 is a flowchart illustrating a step of receiving an acceleration signal to detect up and down or left and right head motions and generating a character creating instruction based on the received acceleration signal according to an embodiment of the present invention. That is, after an acceleration signal is received at step S401, the received acceleration signal is divided into a plurality of blocks at a predetermined interval at step S402. Then, acceleration value is calculated according to a channel of each acceleration sensor by adding up all of signals in each block at step S403. That is, an approximate velocity value is calculated by integrating acceleration values for a predetermined period.

After the velocity value is calculated at step S403, it is possible to detect a direction of head motion based on the velocity value. For example, if the velocity value is calculated from the acceleration signal sensed by the up and down head motion and the calculated velocity value is positive, the head moves in an up direction. If the calculated velocity value is negative, the head moves in a down direction. However, the positive velocity value may denote a down directional head motion, of the negative velocity value may mean an up directional head motion according to the configuration of a circuitry.

At step S404, the direction of head motion is classified into an up direction, a down direction, a left direction, and a right direction by comparing the velocity values of two channels, up/down and left/right, with a predetermined threshold value. Then, an instruction is generated according to the predefined pattern rule, a character is selected and the selected character is outputted. If the threshold value is 0 or a very small value, a recognition error may be generated because a tiny head movement is also reflected to character selection.

Figure 5:
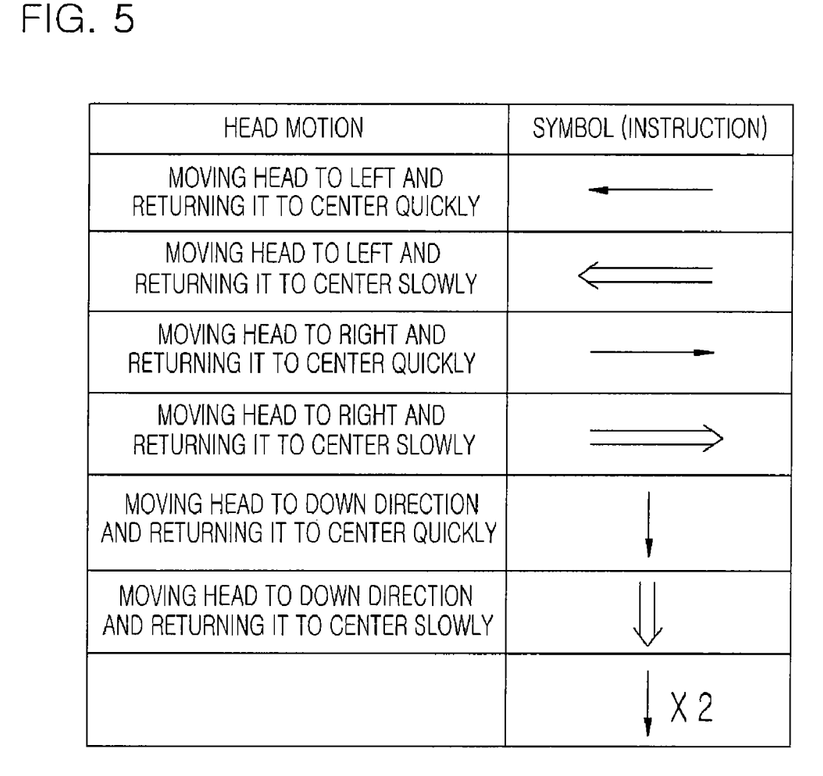
FIG. 5 is a table illustrating the definitions of predetermined patterns of head motion according to an embodiment of the present invention.

FIG. 5 is a table illustrating the definitions of predetermined patterns of head motion according to an embodiment of the present invention. For convenience, head motions are defined as symbols to clearly describe the instruction to input character.

Referring to FIG. 5, a user may shift keys in a keyboard layout displayed on a screen by making different patterns of head motions. As shown in FIG. 5, a left directional arrow (←) denotes a head motion made by moving a head to the left and returning to the original position. A right direction arrow (→) denotes a head motion made by moving a head to right and returning to the original position. Also, such head motions are further classified by a time of returning back to the original position, and different symbols are assigned to the head motions. For example, an arrow with one line (←) or an arrow with two lines (⇐is assigned.

In the apparatus and method for inputting characters by making head motion according to an embodiment of the present invention, instructions for selecting numeral keys include six instructions, the first instruction (←) generated by a head motion of moving a head to left and returning to the center quickly, the second instruction (⇐generated by a head motion of moving a head to left and returning to the center slowly, the third instruction (→) generated by a head motion of moving a head to right and returning to the center quickly, the fourth instruction (⇒)generated by a head motion of moving a head to right and returning to the center slowly, the fifth instruction (↓) generated by a head motion of moving a head to the down direction and returning to the center quickly, and the sixth instruction ⇓generated by a head motion of moving a head to a down direction and returning to the center slowly. The terms 'quickly' and 'slowly' are distinguished by a predetermined threshold value. If the head moves faster than a predetermined threshold value, it is defined as 'quickly'. If not, it is defined as 'slowly'.

The head motion made in the up, down, left, and right directions are defined as the six basic instructions, and a numeral key is selected from a keyboard based on the six basic instructions.

Since the six basic instructions only allows a user to select about 20 to 30 of English alphabets or Korean characters, it needs additional instructions for selecting and inputting characters assigned to each selected numeral key in a keyboard.

Therefore, in order to select and input one of three characters assigned to the selected numeral key, another head motion of repeatedly moving a head to a down direction and returning to the center quickly is defined. That is, one of three characters allocated to a numeral key is selected by repeating the head motion of moving a head to a down direction and returning to the center quickly once, twice or three times (↓×1, ↓×2, ↓×3, . . . ). If the head motion is performed once, the first one of the three characters is selected. If the operation is performed twice, the second one is selected. If the operation is performed three times, the third one is selected.

As described above, the method of selecting one of numeral keys and inputting characters allocated to the selected numeral key using the total seven operations can be designed in various ways. However, one exemplary embodiment is described in the present invention in consideration of the convenience of use.

Figure 6:
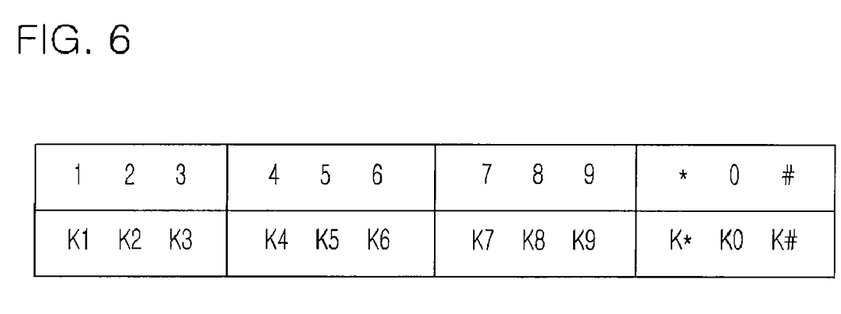
FIG. 6 is a table showing a 1×4 (row×column) keyboard layout according to an embodiment of the present invention.
Figure 7:
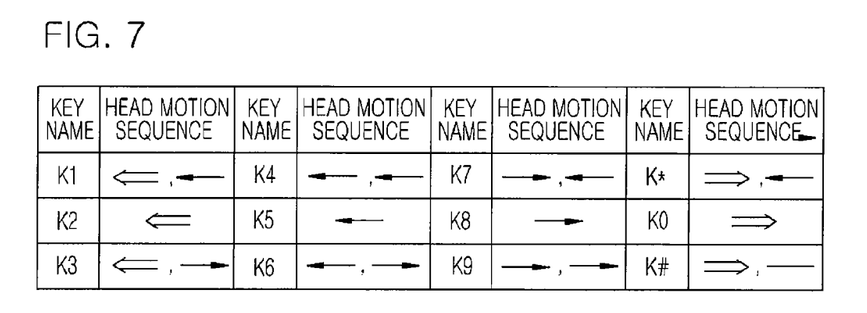
FIG. 7 is a table showing head motion sequences to select each numeral key from a keyboard shown in FIG. 5.

FIG. 6 and FIG. 7 are tables showing symbols defined according to head motions to select names and numeral keys according to an embodiment of the present invention.

At first, FIG. 6 shows a 1×4 (row and column) keyboard layout. Four numeral groups are formed using 1×4 keyboard layout, and the numbers of each numeral key are defined as K0 to K9, K*, and K#.

FIG. 7 is a table showing head motion sequences to select each numeral key from a keyboard shown in FIG. 5.

For example, if a head moves to the left and returns to the center quickly (←), a numeral group '4, 5, 6' is selected. If a head moves to the left and returns to the center slowly (⇐) a numeral group '1, 2, 3' is selected. If a head moves to the right and returns to the center quickly (→), a numeral group '7, 8, 9' is selected. If a head moves to the right and returns to the center slowly (⇒) a numeral group '*, 0, #' is selected.

If a numeral group is selected, a numeral key disposed at the middle of the selected numeral group is basically selected. If a user wants to select another key rather than the basically selected key, the user can select the other key in the same numeral group by moving the head in the left or the right. That is, if a user moves the head to the left and returns it to the center quickly (←), a key disposed at the left of the middle key is selected in the same numeral group. If a user moves the head to the right and returns it to the center quickly (→), a key disposed at the right of the middle key is selected in the same numeral group.

For example, if a user moves a head to the left and returns it to the center quickly, the numeral group '4, 5, 6' is selected. Herein, a key '5' is selected automatically. If the user moves the head to the left and retuning it to the center quickly again, a key 4 is selected. If the user moves the head to the right and retuning it to the center quickly again, a key 6 is selected.

Therefore, when a user wants to input numeral keys, the user can easily input the desired number by making two head motions.

When a user wants to cancel the input selection because the user makes wrong selection, the user can cancel the input selection by moving the head to the opposite direction from the currently selected numeral group. That is, in case of keys K1 to K6, the head motion ⇒ is performed. In case of K7 to K9, K0, K*, and K#, the head motion ⇐ is performed.

In case of inputting alphabets or Korean characters, a numeral key is selected as shown in FIG. 7, and a character allocated to the selected numeral key inputs by making head motion again. If three characters are assigned to one numeral key, all of English alphabets or Korean characters can be selected.

Figure 8:
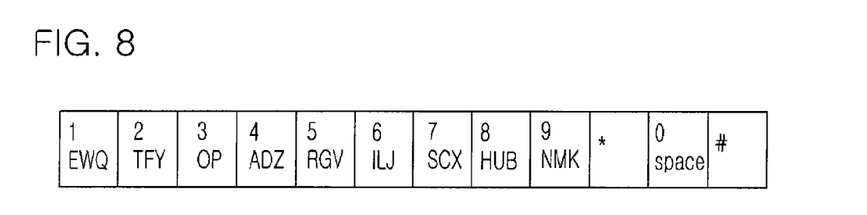
FIG. 8 is a diagram showing alphabets assigned to each numeral key.
Figure 9:
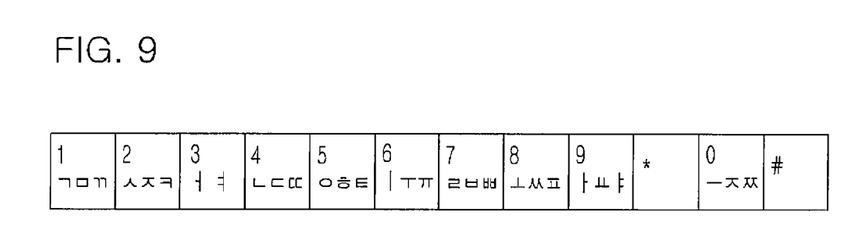
FIG. 9 is a diagram showing Korean characters assigned to each numeral key.

Characters may be assigned to each numeral key in various ways. FIG. 8 and FIG. 9 show one of examples of assigning English alphabets and Korean alphabets to corresponding numeral key.

Referring to FIG. 8, a numeral key is selected as shown in FIG. 7, and one of characters assigned to the selected numeral key is selected and inputted by making a head motion of moving a head to a down direction and returning it to the center once (↓), twice (↓×2), or three times (↓×3). That is, after a numeral key is selected, the head motion '↓' is performed for selecting the first character, the head motion '↓×2' is performed for selecting the second character, and the head motion '↓×3' is performed for selecting the third character.

Herein, '×2' and '×3' denote that the number of performing corresponding head motions. That is, '×2' denotes the two times of corresponding head motion, and '×3' denotes the three times of corresponding head motion. Also, the head motion '↓×3' can be replaced with the head motion ⇓ that moves a head to a down direction and returns it to the center slowly. If more than four characters are assigned to each key, each of characters can be selected by performing the head motion (↓) that moves the head to the down direction and returns it to the center quickly as many as the number of characters.

For example, if a user wants to input a character 'E', a user makes a head motion (⇐ that moves a head to the left and returns it to the center slowly to select a numeral group having the alphabet E. Then, the user makes a head motion (←) that moves a head to the left and returns it to the center quickly to select a numeral key assigned with the alphabet E. Then, the user makes a head motion (↓) that moves a head to the down direction and returns it to the center quickly to select the alphabet E among the alphabet signed to the selected numeral key. That is, the user makes the head motion sequence of ⇐←, and ↓. If a user wants to input an alphabet W, the user makes the head motion sequence of ⇐← ↓×2. If a user wants to input an alphabet Q, the user makes the head motion sequence of ⇐←, and ↓×3.

Meanwhile, various functions can be assigned to K*, or K#, such as a function of converting Korean character to English character, a function of a backspace key, a function of line change, and a function of spacing words. Also, when a user wants to change English keyboard layout to Korean keyboard layout, a user moves a head to the left and returns it to the center very slowly. Then, a menu having a list of keyboard layouts is displayed on a screen. The user may select the desired keyboard layout by making a predetermined head motion. Also, a user may move a head to the down direction and return it to the center quickly to apply the selected keyboard layout and to display the selected keyboard layout on the screen.

Figure 10:
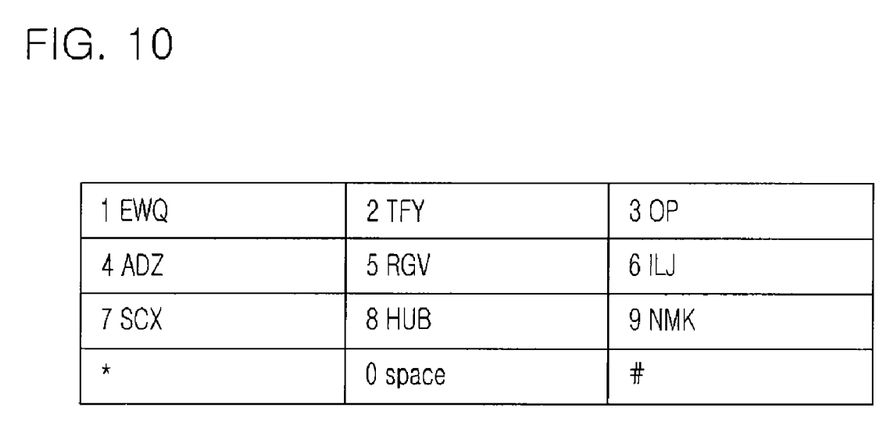
FIG. 10 is a diagram showing alphabets assigned to numeral keys of a 4×3 (row×column) telephone keyboard.
Figure 11:
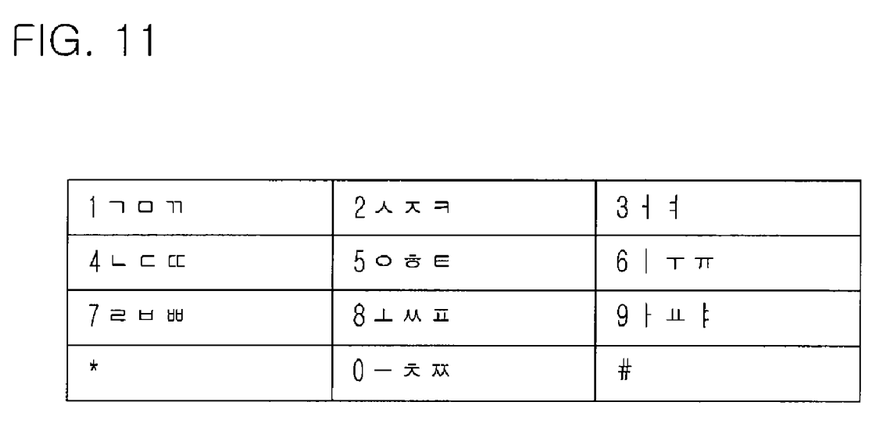
FIG. 11 is a diagram showing Korean characters assigned to numeral keys of a 4×3 (row and column) telephone keyboard.

In the present embodiment, a telephone keyboard layout, for example, a 4×3 keyboard layout, can be used as shown in FIG. 10 and FIG. 11. FIG. 10 and FIG. 11 show the arrangements of numbers, English alphabets and Korean alphabets in 4×3 keyboard layout. As shown in FIG. 10 and FIG. 11, maximum three alphabets can be assigned to one numeral key. Although the keyboard layout shown in FIG. 10 and FIG. 11 is different from that of FIG. 8, and FIG. 9, the method of inputting characters using head motion according to the present embodiment can be identically applied to the keyboard layout shown in FIG. 10 and FIG. 11.

It will be apparent to those skilled in the art that various modifications and variations can be made in the present invention. Thus, it is intended that the present invention covers the modifications and variations of this invention provided they come within the scope of the appended claims and their equivalents.

As described above, the apparatus and method for inputting characters using head motion according to the present invention enables a disabled perform to easily input characters using terminals such as a mobile phone and a computer by making a predetermined head motion to the up, down, left and right directions, enabling the disabled perform to communicate through exchanging texts.

What is claimed is:

1. A method for inputting a character by moving a head comprising the steps of:
   displaying a keyboard on a screen including a plurality of numeral groups,
   a) selecting a predetermined numeral group from among the plurality of numeral groups by a first head motion including moving the head in a first direction at a first velocity, and moving the head in a second direction at a second velocity that is different from the first velocity;
   b) selecting a numeral key in the selected numeral group by sensing the first head motion; and
   c) inputting the selected numeral key.

2. The method of claim 1, further including selecting one of a plurality of characters assigned to the selected numeral key by sensing a second head motion.

3. The method of claim 2, wherein the second head motion includes moving the head in a down direction at a third velocity and returning it to a center at a fourth velocity.

4. The method of claim 3, wherein the second head motion is performed a number of times, the number of times corresponding to the location of the character in the numeral key.

5. The method of claim 1, wherein the keyboard displayed on the screen is a 1.times.4(row×column) layout, includes a plurality of numeral groups, a numeral group includes three numeral keys, and a numeral key includes three characters.

6. The method of claim 1, wherein the keyboard displayed on the screen is a 4.times.3(row×column) layout, includes a plurality of numeral groups, a numeral group includes three numeral keys, and a numeral key includes three characters.

7. The method of claim 1, wherein the first head motion is a head motion of moving the head in a left direction and returning it to a center, a head motion of moving the head in a right direction and returning it to a center, or a head motion of moving the head in a down direction and returning it to a center.

8. The method of claim 1, wherein the first and second head motions further include moving the head in a left direction and returning it to a center at a speed slower than a predetermined threshold, moving the head in a left direction and returning it to a center at a speed faster than a predetermined threshold, moving the head in a right direction and returning it to a center at a speed slower than a predetermined threshold, moving the head in a right direction and returning it to a center at a speed faster than a predetermined threshold, moving the head in a down direction and returning it to a center at a speed slower than a predetermined threshold, or moving the head in a down direction and returning it to a center at a speed faster than a predetermined threshold.

9. The method of claim 1, wherein the selection of a predetermined numeral group is canceled by moving the head in a direction opposite to the first direction.

10. The method of claim 1, wherein the first head motion is selected from a group consisting of left, right, up, and down, and the second head motion is in the opposite direction of the first head motion.

11. The method of claim 1, wherein the first velocity is faster or slower than a predetermined threshold.

12. The method of claim 1, wherein the second velocity is faster or slower than a predetermined threshold.

13. The method of claim 1, further including determining the first velocity by sensing and integrating an acceleration.

14. An apparatus for inputting characters of a keyboard displayed on a screen by sensing a head motion, comprising:
   a first acceleration sensor configured to sense vertical acceleration,
   a second acceleration sensor configured to sense horizontal acceleration,
   a signal detecting device configured to detect signals from the first and second acceleration sensors, to generate acceleration signals based on the sensed motion, and to transmit the generated acceleration signals; and
   a signal processor configured to select a predetermined character by determining the head motion according to predefined basic patterns by receiving the acceleration signals,
   wherein the signal processor includes a basic pattern recognizer configured to recognize a pattern based on a first head motion including moving the head in a first direction at a first velocity, and to recognize a second head motion including moving the head in a second direction at a second velocity that is different from the first velocity.

15. The apparatus of claim 14, wherein the signal detecting device includes at least two one-axial acceleration sensors disposed orthogonally for sensing up and down head motions and left and right head motions.

16. The apparatus of claim 14, wherein the signal processor includes:
   a signal receiver configured to receive acceleration signals generated according to the up and down head motions or the left and right head motions;
   a basic pattern recognizer configured to recognize an up direction, a down direction, a left direction, and a right direction of a head motion by dividing the received acceleration signal into blocks at a regular interval, adding the blocks, calculating a velocity value for each of one-axial acceleration sensor, and comparing the calculated velocity value with a predetermined threshold value;
   an instruction generator configured to select a corresponding character by determining a head motion of moving the head in a left direction and returning it to a center at a speed slower than a predetermined threshold, a head motion of moving the head in a left direction and returning it to a center at a speed faster than a predetermined threshold, a head motion of moving the head in a right direction and returning it to a center at a speed slower than a predetermined threshold, a head motion of moving the head in a right direction and returning it to a center at a speed faster than a predetermined threshold, a head motion of moving the head in a down direction and returning it to a center at a speed slower than a predetermined threshold, and a head motion of moving the head in a down direction and returning it to a center at a speed faster than a predetermined threshold according to the detected basic patterns; and
   a character outputting unit configured to display the keyboard on a screen, and displaying a selected character from the instructor generator.

17. An apparatus for inputting characters using head motions, including:

a motion sensing module including a first acceleration sensor configured to detect horizontal acceleration and a second acceleration sensor configured to detect vertical acceleration;

a signal receiver configured to receive acceleration signals from the motion sensing module;

a basic pattern recognizer configured to integrate the acceleration signals to determine a velocity, and to compare the velocity to a threshold velocity;

an instruction generator configured to generate an instruction based on the result of the comparison; and a character output unit configured to output a selected character.

* * * * *